United States Patent [19]
Bonner et al.

[11] Patent Number: 5,463,320
[45] Date of Patent: * Oct. 31, 1995

[54] APPARATUS AND METHOD FOR DETERMINING THE RESITIVITY OF UNDERGROUND FORMATIONS SURROUNDING A BOREHOLE

[75] Inventors: Stephen D. Bonner, Sugar Land; Richard A. Rosthal; Abdullah A. Bagersh, both of Houston, all of Tex.; Martin G. Luling, Danbury, Conn.; Jacques A. Jundt, Missouri City, Tex.

[73] Assignee: Schlumberger Technology Corporation, New York, N.Y.

[ * ] Notice: The portion of the term of this patent subsequent to Aug. 16, 2011, has been disclaimed.

[21] Appl. No.: 259,849

[22] Filed: Jun. 15, 1994

Related U.S. Application Data

[63] Continuation-in-part of Ser. No. 955,101, Oct. 10, 1992, Pat. No. 5,339,037.

[51] Int. Cl.$^6$ .............................. G01V 3/20; G01V 3/18
[52] U.S. Cl. ........................................ 324/366; 324/369
[58] Field of Search ................................ 324/366, 369, 324/370, 338, 339, 340, 341, 342, 343, 355, 356

[56] References Cited

U.S. PATENT DOCUMENTS

| | | |
|---|---|---|
| 2,354,887 | 8/1944 | Silverman et al. . |
| 3,186,222 | 6/1965 | Martin . |
| 3,187,252 | 6/1965 | Hungerford . |
| 3,305,771 | 2/1967 | Arps . |
| 3,408,561 | 10/1968 | Redwine et al. . |
| 3,967,201 | 6/1976 | Rorden . |

(List continued on next page.)

FOREIGN PATENT DOCUMENTS

| | | |
|---|---|---|
| 685727 | 5/1964 | Canada . |

| | | |
|---|---|---|
| 540425A2 | 10/1992 | European Pat. Off. . |

OTHER PUBLICATIONS

S. Gianzero et al., "A new resistivity tool for measurement–while–drilling", SPWLA Twenty–Sixth Annual Logging Symposium, Jun. 17–20, 1985.

T. I. F. Grupping et al., "Performance update of a dual–resistivity MWD tool with some promising results in oil–based mud applications", SPE 18115, pp. 73–85, Oct. 2–5, 1988, Houston, Tex.

T.I. F. Grupping et al., "Recent performance of the dual–resistivity MWD Tool", SPE Formation Evaluation, pp. 171–176, Jun. 1990.

S. Gianzero et al., "Determining the invasion near the bit with the MWD toroid sonde", SPWLA Twenty–Seventh Annual Logging Symposium, pp. 1–17, Jun. 9–13, 1986.

Schlumberger Log Interpretation Principles, vol. 1, pp. 19–25 (1972).

*Primary Examiner*—Walter E. Snow
*Attorney, Agent, or Firm*—Martin D. Hyden; Leonard W. Pojunas

[57] ABSTRACT

A logging tool for use in determining the resistivity of an underground formation surrounding a borehole comprises a mandrel with two transmitters spaced apart thereon, each serving to establish a current in the mandrel and in the underground formation. A series of electrodes are spaced along the body between the transmitters and sensors, located at each electrode, measure radial current flow along a path from the mandrel to the underground formation via a respective electrode. Sensors also provide the axial current flowing along the whole mandrel and at positions corresponding to each electrode. A method of determining the formation resistivity includes the steps of measuring the radial currents $R_1$ $R_2$ from the mandrel to the formation via each electrode and obtaining the axial currents $M_{01}$ $M_{02}$ along the mandrel at each electrode due to each transmitter; measuring the total axial current $M_{12}$ along the mandrel from the first or second transmitter and deriving the resistivity of the formation from the radial focused current $R_c$ for each electrode according to the relationship $R_c=1/M_{21}(M_{02}R_1+M_{01} R_2)$.

18 Claims, 8 Drawing Sheets

U.S. PATENT DOCUMENTS

| | | |
|---|---|---|
| 4,360,777 | 11/1982 | Segesman . |
| 4,553,097 | 11/1985 | Clark . |
| 4,567,759 | 2/1986 | Ekstrom et al. . |
| 4,575,681 | 3/1986 | Grosso et al. . |
| 4,578,675 | 3/1986 | MacLeod . |
| 4,618,828 | 10/1986 | Raynal . |
| 4,630,243 | 12/1986 | MacLeod . |
| 4,692,908 | 9/1981 | Ekstrom et al. . |
| 4,725,837 | 2/1988 | Rubin . |
| 4,739,325 | 4/1988 | MacLeod . |
| 4,786,874 | 11/1988 | Grosso et al. . |
| 4,839,644 | 6/1989 | Safinya et al. . |
| 4,912,415 | 3/1990 | Sorenson . |
| 4,979,151 | 12/1990 | Ekstrom et al. . |
| 5,017,778 | 5/1991 | Wraight . |
| 5,045,795 | 9/1991 | Gianzero et al. . |
| 5,130,950 | 7/1992 | Orban et al. . |
| 5,200,705 | 4/1993 | Clark et al. . |
| 5,235,285 | 8/1993 | Clark et al. . |
| 5,339,037 | 8/1994 | Bonner et al. .......................... 324/366 |

1

APPARATUS AND METHOD FOR DETERMINING THE RESITIVITY OF UNDERGROUND FORMATIONS SURROUNDING A BOREHOLE

RELATED APPLICATIONS

The present application is a continuation-in-pan of patent application Ser. No. 07/955,101, filed Oct. 10, 1992 and assigned to Schlumberger Technology Corporation, now U.S. Pat. No. 5,339,037.

FIELD OF THE INVENTION

The present invention relates to an apparatus and method for logging the resistivity of an underground formation. In particular, the invention relates to an apparatus and a method for wireline logging of boreholes such as oil or gas wells.

BACKGROUND OF THE INVENTION

U.S. Pat. No. 5,399,037 ("'037 application") which is incorporated herein by reference, discloses a logging-while-drilling apparatus as shown in FIG. 1. This apparatus comprises a subsystem 200 which forms part of a bottom hole assembly (BHA) of a drill string in a borehole (not shown).

The subsystem 200 includes a section of tubular drill collar 202 having mounted thereon a transmitting antenna 205, a receiving antenna 207, and receiving electrodes 226, 227, 228 and 235. In the illustrated subsystem the transmitting antenna 205 comprises a toroidal antenna having coil turns wound on a ferromagnetic toroidal core that is axially coincident with the axis of the drill collar 202. The core may have an elliptical or rectangular cross-section, although other shapes can be used. The purpose of this toroidal transmitter is to act as a primary of a transformer and to induce a voltage along the drill collar. The drill collar and the formations represent a one-turn secondary winding. If the transmitter is excited with a drive voltage $V_T$ and the transmitter toroid has NT turns, then the voltage induced along the drill collar will be $V_T/N_T$. That is, the voltage difference between the drill collar above the transmitter and the drill collar below the transmitter will be $V_T/N_T$. The resultant current travels in a path that includes the drill string and the formations (as well as the borehole fluid which is assumed to have substantial conductivity). The receiving electrodes 226, 227 and 228 are button electrodes mounted in a stabilizer 220, and electrode 235 is a ring electrode. The receiving antenna 207 is another toroidal coil antenna. The toroidal receiver measures the axial current flowing through the drill collar. If the receiver toroid contains NR turns and the current in the drill collar is I, the current flowing through the receiver winding into short circuit will be $I/N_R$.

An annular chassis 290, which contains most of the electronics, fits within the drill collar 202. In this configuration, the drilling mud path is through the center of the chassis, as illustrated by arrows 299. The chassis 290 has a number of slots, such as for containment of batteries (at position 29 1 ) and circuit boards (not shown). In this configuration the circuit boards are in the form of elongated thin strips, and can accordingly be planar. Other circuit board configurations or circuit packaging can be utilized. The transmitting toroidal antenna 205 [which can also be utilized in a communications mode as a receiver] is supported in a suitable insulating medium, such as "VITON" rubber 206. The assembled coil, in the insulating medium, is mounted on the collar 202 in a subassembly which includes a protective tapered metal ring 209, that is secured to the collar surface by bolts (not shown). The antenna wiring, and other wiring, is coupled to the annular circuit assembly via bulkhead feed-throughs (not shown). The receiving toroidal coil antenna 207 is constructed in generally the same way, although with more coil turns in the described configuration, in insulating medium 211, and with protective ring 213. The receiving ring electrode 235 is also mounted in an insulating medium such as a fiberglass-epoxy composite 236, and is held in a subassembly that includes tapered ring 237, which can be integrated with the protective ring for the receiving antenna 207.

The three button electrodes 226, 227 and 228 are provided in stabilizer blade 220 which may have, for example, a typical straight or curved configuration. The stabilizer blades are formed of steel, integral with a steel cylindrical sleeve that slides on the drill collar 202 and abuts a shoulder 203 foraged on the drill collar. The stabilizer is secured to collar 202 with lock nuts 221. The blades can be undersized to prevent wear of the electrodes. The button faces can have generally cylindrical curvatures to conform to the stabilizer surface or can have flat faces with surfaces that are slightly recessed from the stabilizer surface shape. These electrodes span only a small fraction of the total circumferential locus of the borehole and provide azimuthal resistivity measurements. Also, these electrodes have a vertical extent that is a small fraction of the vertical dimension of the stabilizer on which they are mounted, and provide relatively good spatial resolution resistivity measurements. In the described configuration, the top portion of each electrode is surrounded by an insulating medium, such as "VITON" rubber, which isolates the electrode surface from the surface of the stabilizer blade 220. A fiberglass epoxy composite can be used around the base of the electrode. The electrodes 226, 227 and 228 provide a return path from the formations to the collar 202 (of course, when the AC potential reverses the current path will also reverse), and the current is measured to determine lateral resistivity of the region of the formation generally opposing the electrode. The electrodes 227 and 228 are respectively further from the transmitter than the electrode 226, and will be expected to provide resistivity measurements that tend to be respectively deeper than the measurement obtained from electrode 226. The electrodes are mounted in apertures in the stabilizer 220 that align with apertures in the drill collar 202 to facilitate coupling of the electrodes to circuitry in the annular chassis 290.

The '037 Patent also discloses further apparatus as shown in FIG. 2, which has toroidal transmitter T1 and a ring electrode R on a conductive body 1202 which is like the drill collar 202 in a logging-while-drilling setup of the general type shown in FIG. 1. A further toroidal transmitter, T2, also called a lower transmitter, is located near the drill bit 15. For this example, the ring electrode is about equidistant from the transmitters. A receiver monitor toroid $M_0$ is located near the ring electrode R to monitor the axial current flowing along the conductive body at the position of the ring electrode R. A lower receiving or monitoring toroid $M_2$ is located adjacent the lower transmitter $T_2$.

The axial current which is induced by T1 is linear with respect to the voltage induced on the drill collar and approximately inverse to the resistivity of the earth formation surrounding the tool. The axial current which is induced by T2 is linear with respect to the voltage induced on the drill collar by T2 and approximately inverse to the resistivity of the earth formation surrounding the tool. The net axial current which flows along the drill collar at any point is the linear superposition of the induced current from T1 and T2. For the voltage of T2 to be adjusted so that the net axial current flowing through the monitor toroid M0 is zero will require that the current induced by T2 be opposite in phase to the current induced by T1, so that when the upper transmitter is driving current down the tool, the lower transmitter is driving the current up, and vice versa. All of the current leaving the tool between the lower transmitter and the monitor returns to the tool below the lower transmitter while all of the current leaving the tool between the upper transmitter and the monitor returns to the tool above the upper transmitter. This has the effect of isolating the region of the tool above the monitor from the region of the tool below the monitor since no current flows between them, either on the collar or through the formation. As a result, the resistivity determined from the ring current more accurately represents the resistivity of formations surrounding the ring R.

A similar result can be obtained by energizing the transmitters separately and computing a compensated ring current (the upper position is designated 1, the lower position is designated 2, and the center position is designated 0). The ring and toroid currents when the upper transmitter is operated at an arbitrary but fixed voltage are $R_1$, $M_{01}$, and $M_{21}$ and the ring and toroid currents when the lower transmitter is operated at the same voltage are $R_2$, $M_{02}$, and $M_{12}$. Consider a compensated current of the form:

$$R_c = 1/M_{02} (M_{02}R_1 + M_{01}R_2) \quad (1)$$

$$R_c = R_1 + \frac{M_{01}}{M_{02}} R_2 \quad (1a)$$

In equation (1a), the ratio $$\frac{M_{01}}{M_{02}}$$

is the adjustment factor for the lower transmitter to achieve the condition of zero axial current at M0. The expression $$R_1 + \frac{M_{01}}{M_{02}} R_2$$

is the ring current for the condition of zero axial current. The prefactor, $1/M_{02}$ corresponds to a fixed voltage at T1 and a voltage at transmitter T2 of $$\frac{M_{01}}{M_{02}}.$$

The preferred factor is , $1/M_{21}$ where $M_{21}$ is the current produced by the upper transmitter measured at the lower monitor toroid M2 (which is at substantially the same position as the lower toroidal transmitter T2). In this case, the compensated current is given by $R_c=1/_{M_{21}}(M_{02}R_1+M_{01}R_2)$.

The two terms in equation (1a) add. This is due to the fact that operating the two transmitters in opposition in order to achieve a zero axial current at the monitor toroid causes an increase in the ring current. That is, when the upper transmitter drives a current down the mandrel, current flows out of the ring. Similarly when the lower transmitter drives current up the mandrel, it also causes current to flow out of the ring. The implication of this processing on the noise is that, since the terms add, the noise in the output is not amplified as would be the case if one took a small difference between two large numbers.

The application of these teachings to a wireline logging tool is also disclosed in the '037 Patent.

U.S. Pat. No. 5,200,705 (incorporated herein by reference) also discloses a logging-while-drilling resistivity measurement using a multi electrode array to identify dipping beds in underground formations.

It is an object of the present invention to provide a method and apparatus in which focusing of signals can be achieved using software to reduce borehole effects and shoulder bed effects. It is also an object of the invention to provide good thin bed resolution.

SUMMARY OF THE INVENTION

The present invention provides apparatus for use in determining the resistivity of an underground formation which comprises an elongate body that is moveable through the borehole; first and second transmitters spaced apart on the body, each serving to establish a current in the body and in the underground formation; a plurality of electrodes spaced apart from the body between the transmitters; means, located at each electrode, for measuring radial current flow along a path from the body to the underground formation via a respective electrode; and means for obtaining an axial current flowing along the body at a position corresponding to each electrode.

Preferably, the body comprises a central mandrel and the electrodes comprise ring electrodes surrounding the body and connected thereto. The central mandrel is typically conductive and each electrode has its own electrical connection to the mandrel to keep the electrodes at the same electric potential as the mandrel. Each ring electrode can be extended in the axial direction and separated from it neighbors by an insulating gap. The ring electrodes serve to measure the radial current leaving the mandrel through the ring and the formation resistivity can be determined therefrom. In another embodiment, the ring electrodes are divided circumferentially into segments defining a series of azimuthal electrodes with means for measuring the radial current through each azimuthal electrode.

The method according to the present invention comprises positioning a tool in the borehole which comprises a body having first and second transmitters spaced apart thereon and a plurality of electrodes spaced apart on the body between the transmitters, the method comprising generating a current in the body and the underground formation with the first transmitter and measuring, at each electrode, a first radial current $R_1$ along a path from the body to the formation via that electrode and obtaining a first axial current $M_{01}$ along the body at each electrode; generating a current in the body and the underground formation with the second transmitter and measuring, at each electrode, a second radial current $R_2$ along a path from the body to the formation via that electrode and obtaining a second axial current $M_{02}$ along the body at each electrode; measuring the axial current R02 along the body from the first transmitter at the location of the second transmitter and deriving the resistivity of the formation from the first and second radial currents $R_1$, $R_2$, the first and second axial currents $M_{01}$, $M_{02}$ and the total axial current along the body from the first transmitter at the location of the second transmitter R02. By reciprocity, the axial current $M_{12}$ along the body from the first transmitter at the location of the second transmitter will be the same as the axial current $M_{21}$ along the body for the second transmitter at the location of the first transmitter. Unless otherwise indicated, "$M_{12}$" shall refer to either of these situations.

Preferably, the method comprises calculating the focused radial current $R_c$ for each electrode according to the relationship $R_c=1/M_{21}(M_{02}R_1+M_{01}R_2)$ and determining the resistivity of the formation from the radially focused current $R_c$. The term "focused radial current" is used herein to identify a current which is focused or substantially confined to a radial plane at each electrode or series of azimuthal electrodes, i.e., the axial spread of the current is minimized.

The electrodes are preferably connected to the body in such a way that they are maintained at an equipotential such that current flows deeper into the formation the further an electrode is from either of the transmitters. The current path for electrodes immediately adjacent the transmitters will be wholly within the borehole and so will measure only the mud resistivity which is useful for interpreting measurements from other electrodes. Since the electrodes effectively measure different depths into the formation according to their distance from the transmitter, moving the tool past a given location will allow measurement of resistivity at different radial distances from the borehole. This allows the resistivity of mudcake coating the borehole wall, invaded regions and uninvaded regions to be determined as well as the radial extent of these regions (from a knowledge of the depth of investigation for a given electrode).

The apparatus and the method of the present invention have the advantage that the current path through the electrodes can be focused by manipulation of the measured currents due to the two transmitters as an alternative to accurate control of the transmitters as has been suggested in previously proposed techniques.

In a further aspect of the invention, apparatus for determining the resistivity of an underground formation comprises an elongate, electrically conductive body that is moveable through the borehole; first transmitter means for establishing a first current in the body from a first transmitter position on the body, the first current traveling in a path that includes the body and the formation; a plurality of ring electrodes encircling the body, each having a surface that is electrically isolated from the surface of the body; means for measuring at each ring electrode a first electrical signal resulting from the first current; second transmitter means for establishing a second current in the body from a second transmitter position on the body, the second current traveling in a path that includes the body and the formation; means for measuring at each ting electrode a second electrical signal resulting from the second current; current monitor means for measuring the axial current passing a monitor position on the body to obtain a monitor current value; and means for deriving an indication of formation resistivity as a function of the first and second signals and the monitor current value.

In this further aspect of the invention, the provision of ring electrodes means that all of the formation surrounding the borehole can be surveyed with a relatively straightforward wireline tool.

BRIEF DESCRIPTION OF THE DRAWINGS

The present invention will now be described by way of example with reference to the accompanying drawings, in which.

2FIG. 8 shows a yet further embodiment of the invention; and

Figure 1:
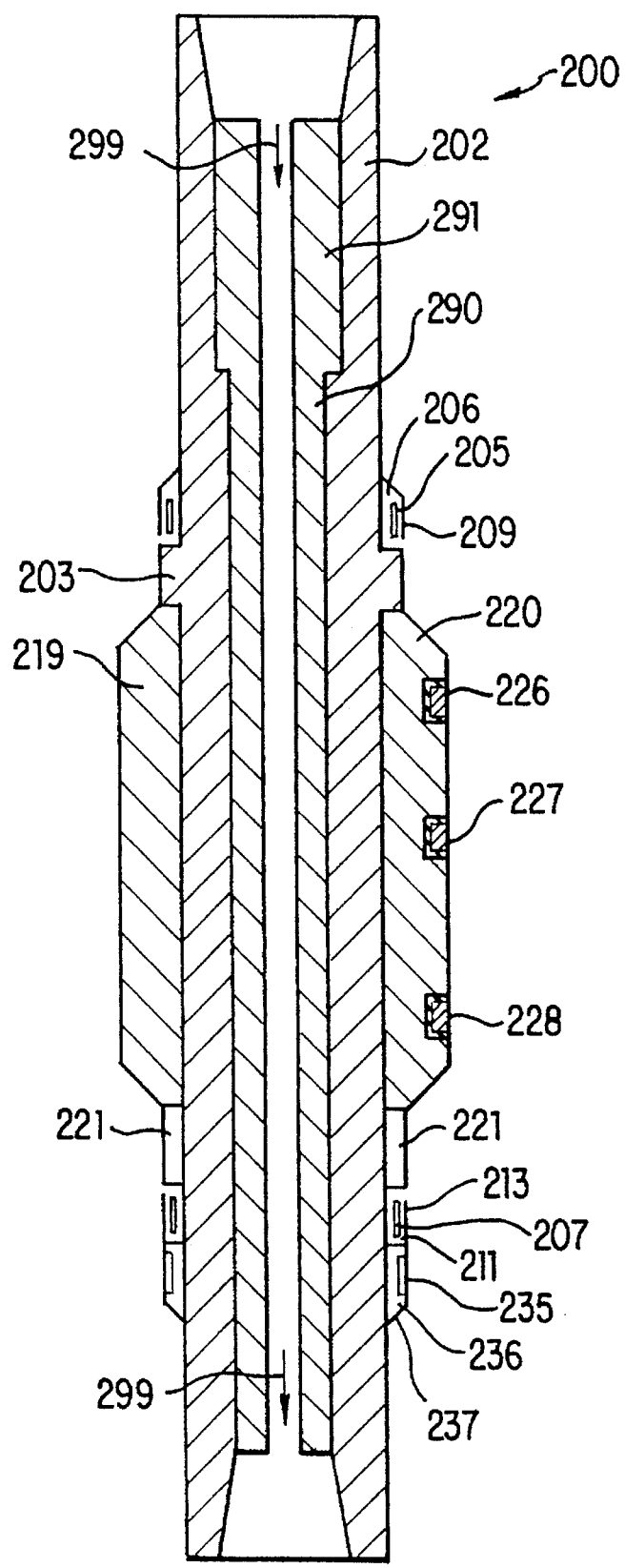
FIGS. 1 and 2 show details of a prior art tool.
Figure 2:
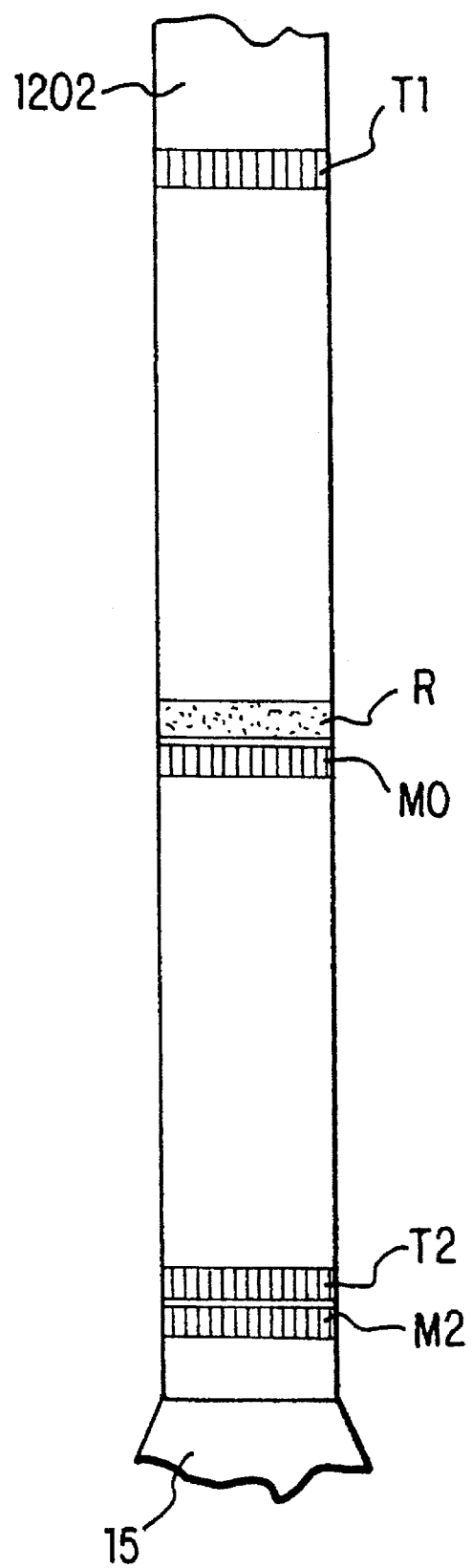
Figure 3:
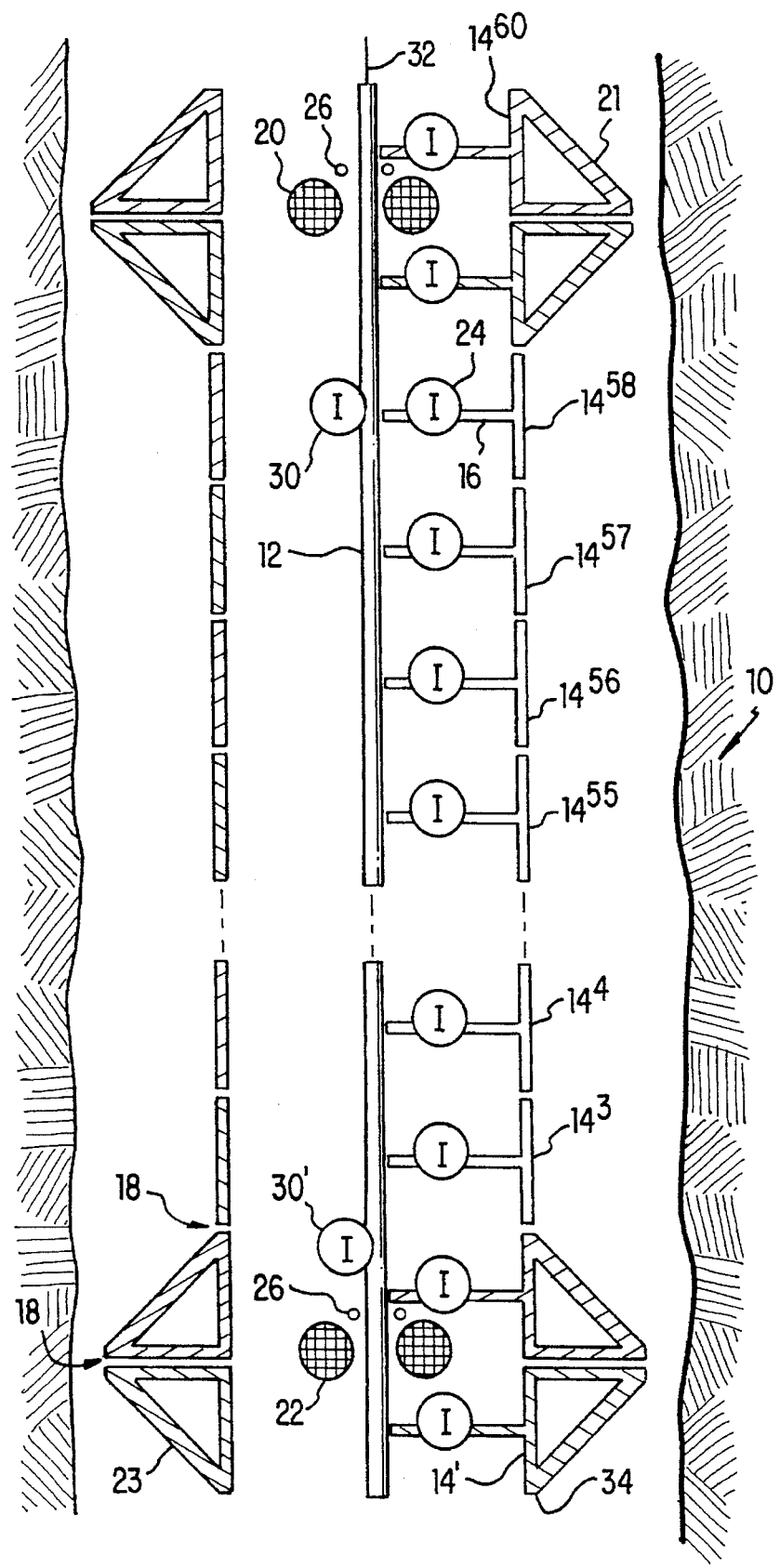
FIG. 3 shows a schematic view of a tool according to one embodiment of the invention.
Figure 9:
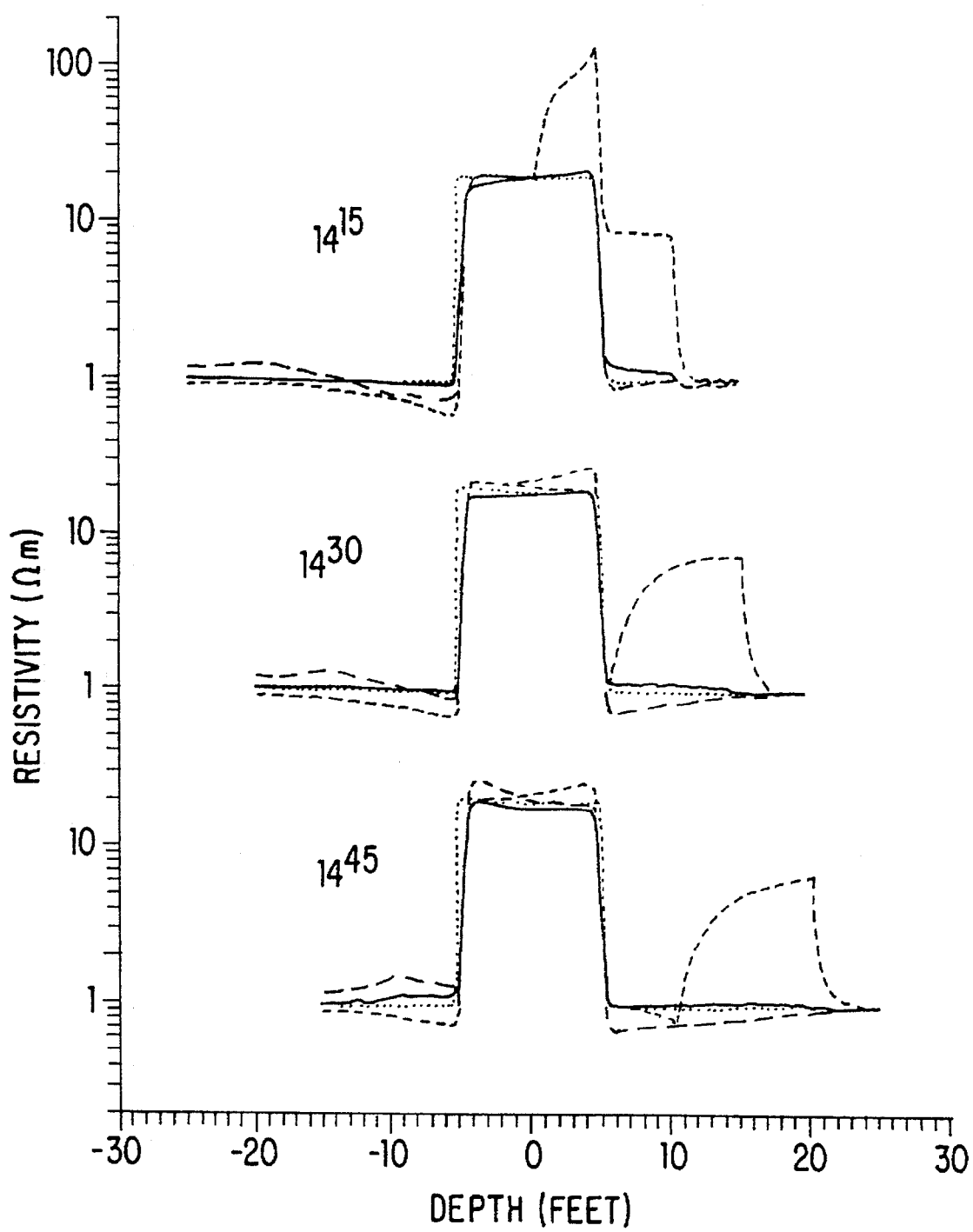

FIG. 9 show a simulated log for the tool of FIG. 3.

DETAILED DESCRIPTION OF THE PREFERRED EMBODIMENT

Figure 4:
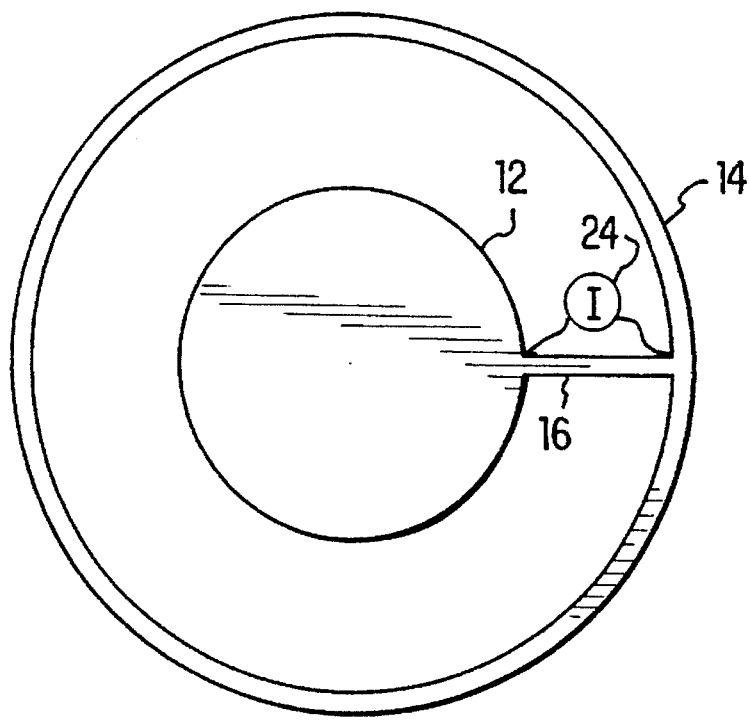
FIG. 4 shows a transverse cross section through the tool shown in FIG. 3.

Referring now to the drawings, FIG. 3 shows a schematic view of a tool according to one embodiment of the present invention. The tool comprises an elongate central metal mandrel 12 having a series of annular metal ring electrodes $14^1$–$14^{60}$ disposed around the mandrel so as to form a segmented outer tube. A plan view of the ring 14 and central mandrel 12 is shown in FIG. 4. Each ring electrode 14 is connected electrically to the mandrel 12 by means of a radial feed 16, and is isolated from its neighbors by means of an insulating gap 18. Transmitters 20, 22 are located at either end of the tool inside the outer tube. The transmitters 20, 22 comprise toroidal solenoids of the type generally described in the '037 Patent although other transmitters such as a voltage gap can be used. The transmitters 20, 22 are required to generate a current in the central mandrel 12 and, via the radial feeds 16 and the ring electrodes 14, the formation 10. Current sensors 24 are provided to measure the current R flowing through each ring electrode 14 and further sensors 26 are provided at each transmitter 20, 22 to measure the current M along the central mandrel 12. The current sensors 24 can comprise a pickup balun or a current-to-voltage converter, or any other measuring device which will minimize any intrinsic ohmic load in the lead. from the central mandrel to the ring electrode. The further sensors 26 can comprise an inductive sensor such as a toroidal solenoid or a pick-up balun or other such device which minimizes the voltage drop along the mandrel 12. Again, typical sensors are described in the '037 Patent. In order to measure R for each ring electrode 14, it is necessary to have a current sensor 24 associated with each ring 14. To determine the axial current M at each ring position it is possible to provide an axial current sensor 30 at each location, to provide a single sensor 26 or 30' measuring the total current along the mandrel 12 which, together with a knowledge of the total current passing through the ring electrodes can be used to derive M at each ring, or combinations of the two depending upon the specific tool geometry.

In order to optimize the response of the tool, it is necessary to fill the borehole with current to saturation. The outer surface of the tool adjacent the transmitter gap is extended radially outwardly to form a bulge 21, 23 to reduce the annular space between the outer surface of the tool and the borehole wall to facilitate filling the borehole with current.

Figure 5:
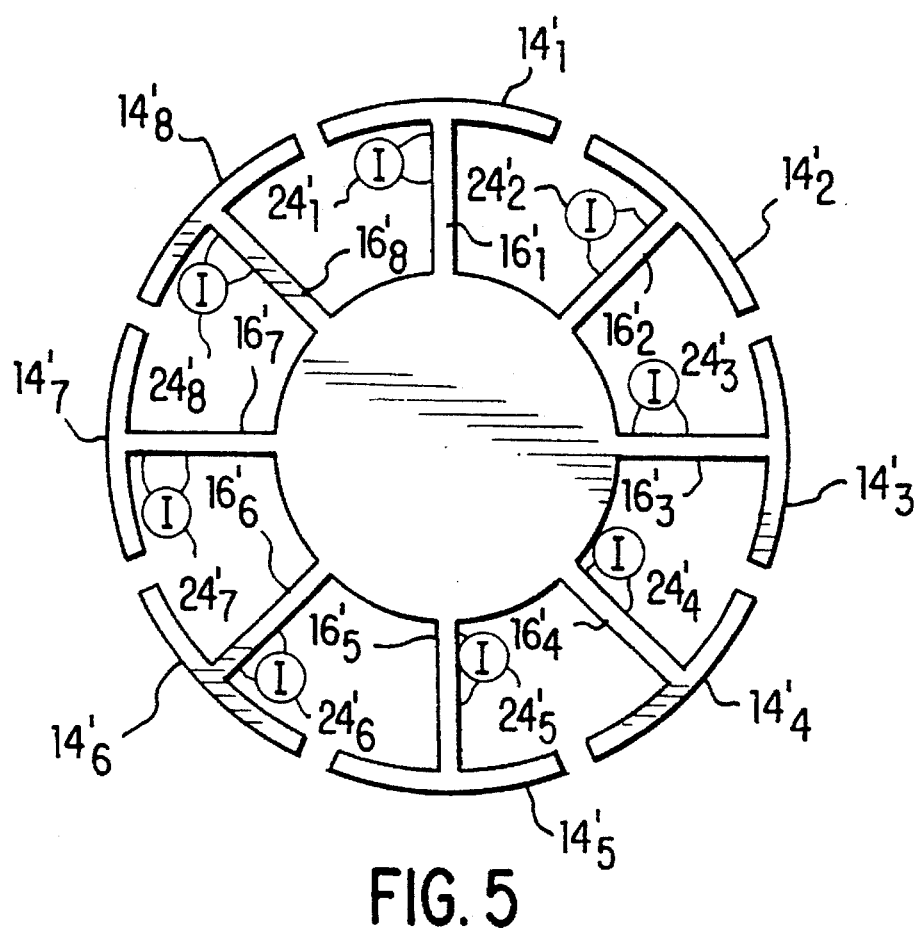
FIG. 5 shows a corresponding view to FIG. 4 for another embodiment of the invention.

FIG. 5 shows a plan view of an alternative form of ring electrode 14' which is divided into azimuthal sections $14'_{1-8}$, each with an associated radial feed $16'_{1-8}$ and radial current sensors $24'_{1-8}$. In this case, eight sections are provided although the number can be varied to suit requirements. Only a single axial current determination is required for each ting.

The size of the ring electrodes 14 is a matter of choice, but the axial extent will determine the resolution of the investigation and the area will determine the magnitude of signal (for a given transmitter signal).

Figure 6:
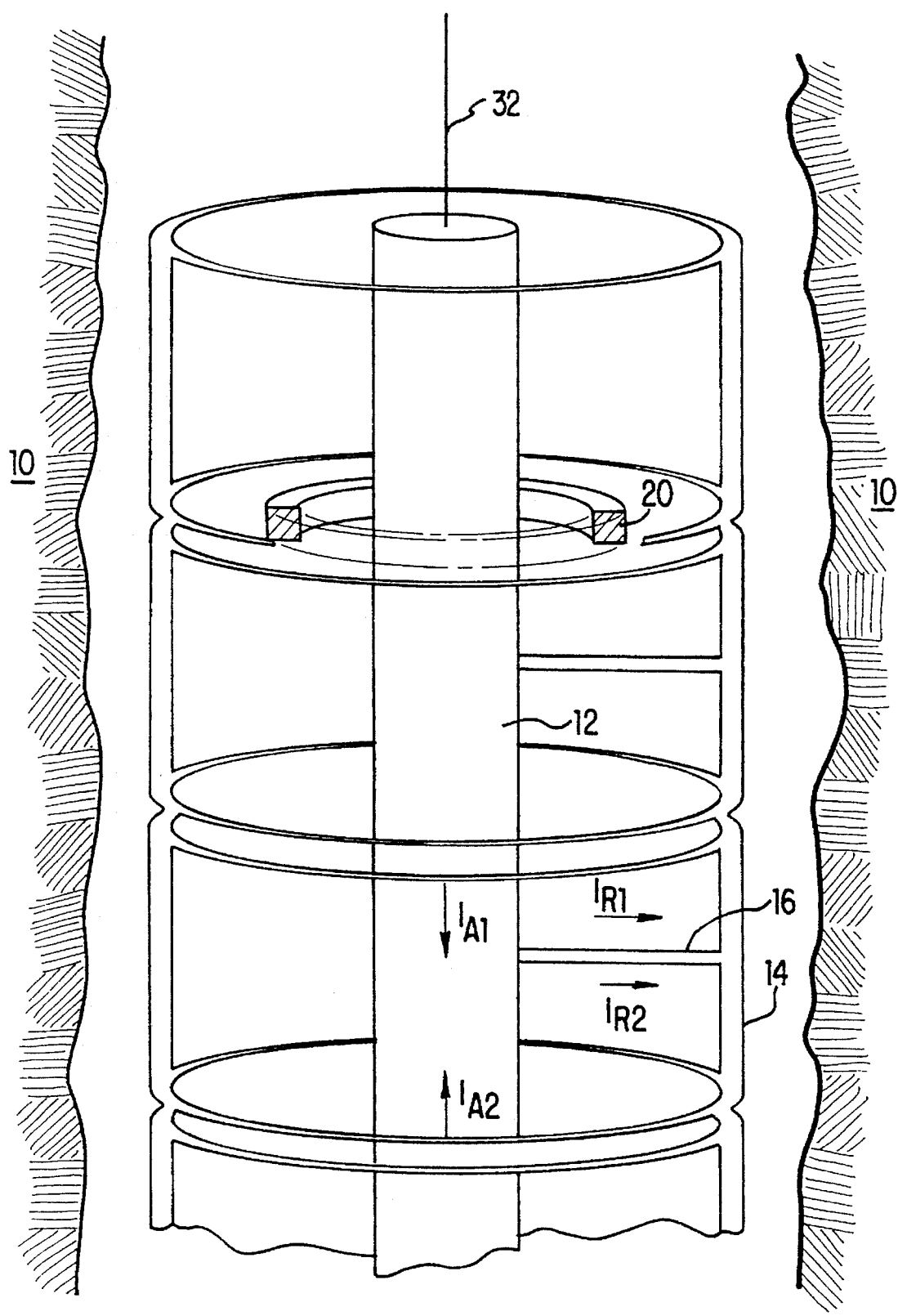
FIG. 6 shows pan of the tool shown in FIG. 3 in detail.

The general mode of operation of the tool shown in FIG. 3 will be explained in relation to FIG. 6 which shows part of the tool. In use, the transmitters 20, 22 operate to induce an alternating current in the central mandrel 12. Because the current is alternating, the following references to current flow relate to the path taken by the current rather than the direction of flow of the current. Current flows from the central mandrel 12 along the radial feed 16 and out into the formation 10 via the ring electrodes 14 and returns above or below the transmitters 20, 22.

Where the transmitter is the upper transmitter 20, the current return is to the wireline cable 32 or, where the tool of the present invention forms part of a tool string, to other tools above the top transmitter 20 by which the tool is suspended in the borehole. Where the transmitter is the lower transmitter 22, the current return is to an electrode 34, or any other conductive point of the tool below the transmitter, or to ground. When not transmitting, the top and bottom transmitters 20, 22 can also be used as receivers for monitoring axial current. Alternatively, specific receivers 26, which may also be toroids, can be located adjacent to the transmitters 20, 22.

Figure 7:
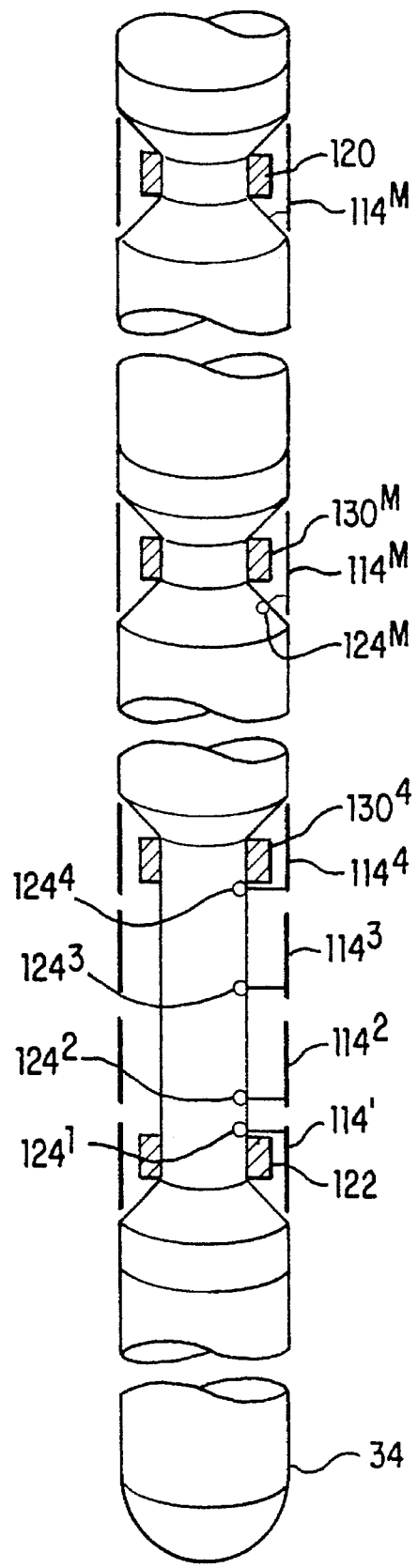
FIG. 7 shows a further embodiment of the invention.

An alternative embodiment of the present invention is shown in FIG. 7. In this case the electrode 34 below the bottom transmitter 22 is extended in order to make the response of the tool to the bottom transmitter 22 more symmetrical with respect to that of the top transmitter 20. Consequently, it is not necessary to have electrodes 14 along the whole length of the mandrel, as is shown in FIG. 3, to provide different depths of investigation since this would merely provide redundancy between electrodes 14 either side of the effective mid-point of the tool. In this case, there is an upper transmitter 120 with an associated ring electrode $114^u$, a ring electrode $114^m$ near the mid point of the tool together with a radial current sensor $124^m$ and an axial current sensor $130^m$, and a bottom transmitter 122 with a series of four closely spaced ring electrodes $114^{1-4}$, each of which has a radial current sensor $124^{1-4}$. An axial current sensor $130^4$ is located at the uppermost of the series of electrodes $114^{1-4}$.

Figure 8A:
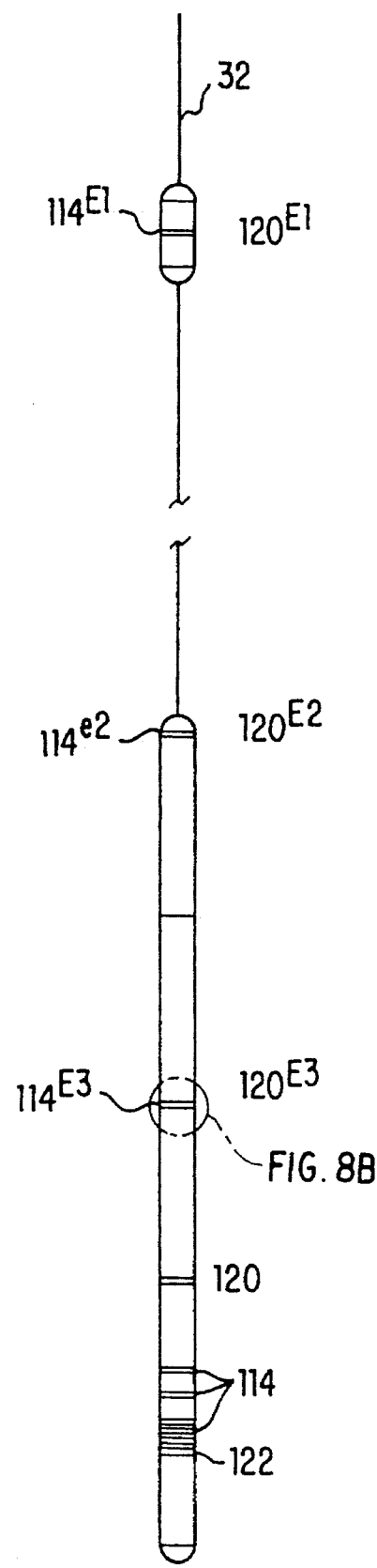
Figure 8B:
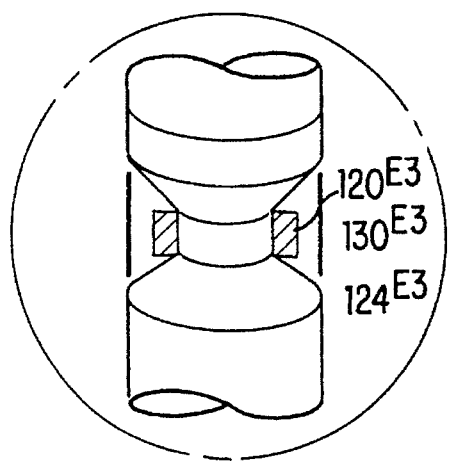

A further embodiment of the invention is shown in FIG. 8. In this case, further transmitters $120^{E1-E3}$ are located above the top transmitter 120, each with an associated ring electrode $114^{E1-E3}$ and radial $124^{E1-E3}$ and axial $130^{E1-E3}$ current sensor. The extension transmitters $120^{E1-E3}$ can be spaced from the main part of the tool by other tools in a tool string, by sections of wireline cable, or both. The uppermost extension transmitter $120^{E1}$ can be used to generate a current which is measured, both axially and radially, at the intermediate extension transmitters $120^{E2-E3}$, at the top transmitter 120 and at the electrodes 114. The intermediate extension transmitters $120^{E2-E3}$ can also be used to generate current which is measured at the transmitters 120 and electrodes 114 below. In this manner, different depths of investigation can be realized.

Operation of the present invention will be described further in relation to FIG. 6. When the top transmitter 20 is active, a current is generated in the mandrel 12. Part of this current passes through the radial feed 16 at each ring electrode 14 and through the electrode into the formation 10 and returns to the tool above the transmitter 20 to the wireline cable 32. The radial current $R_1$ to each electrode 14 due to the top transmitter 20 is measured and the axial current $M_{01}$ in the mandrel 12 at the level of each electrode 14 is either measured or determined (by measuring the axial current at the end of the section of the tool of interest and knowing the radial current for each electrode the axial current at a given electrode will be the axial current measured at the end of that section plus the radial currents measured at the electrode between the electrode of interest and the end of the section). The axial current $M_{12}$ along the tool due to the top transmitter 20 is also measured, typically at the bottom transmitter 22 which is not transmitting at this time. After the current measurements described above have been made, the top transmitter 20 ceases to transmit and the bottom transmitter 22 becomes active to generate a current in the mandrel and ring electrodes in the same way. Radial $R_c$ and axial $M_{02}$ currents are measured or determined as before and signals representing the current generated for processing and analysis. This generally takes place at the surface. A focused radial current $R_c$ is determined for each electrode using the measured currents and the relationship $R_c = 1/M_{21}(M_{02}R_1 + M_{01}R_2)$. (Note: the axial current $M_{12}$ due to the bottom transmitter measured at the location of the top transmitter could equally be used.) The resistance of the formation immediately surrounding is closely related to the reciprocal of the focused radial current $R_c$. The tool is logged through the borehole making these measurements at different depths which can be plotted for evaluation. FIG. 9 shows a simulated log for a tool of the type shown in FIG. 3. Three plots are shown for electrodes $14^{15}$, $14^{30}$ and $14^{45}$ in the series. The plot shows the resistivity determined from the response from the top transmitter only (---), the bottom transmitter only (---), the true resistivity (...) and the focused resistivity (—). As can be seen, the focused current for each electrode corresponds closely to the true resistivity without any of the artifacts present when only one transmitter is used which might otherwise confuse interpretation of the log. Thus accurate identification of beds in the formation is possible. The resolution of the device is dependent on the axial extent of the ring electrode, the shorter the electrode, the thinner the bed which can theoretically be observed. However, the desire for thin bed resolution must also be balanced with the need to provide a sufficiently high radial current for accurate measurement. Further detail of the method for analyzing the results can be found in the '037 Patent.

The electrodes nearest to the transmitters will measure the resistivity of the mud in the borehole. This is useful in interpreting the measurements of the other electrodes since the current paths will inevitably pass through the borehole and be affected by the mud therein. There will be a sharp change in resistivity between the drilling mud and the mudcake so it will be readily apparent which electrode is the first to respond to the mudcake. Since it is possible to determine the depth of investigation of an electrode, it is therefore possible to determine the radius of the borehole at this point, i.e. a caliper measurement. It is well known that drilling fluid invades the formation and modifies the resistivity. The invaded regions are usually well defined, and measuring the resistivity at different radial depths at a location in a well will give the radial extent of the invaded zones. As will be apparent from the foregoing description, each electrode will be focused to a different depth into the formation due to the fact that the outer surface of the tool is maintained at the same potential and the electrodes are located at increasing distances from the transmitter. Thus as the tool is logged up a well, the measurements made by the tool at a given location become increasingly deep as the distance of the electrode adjacent that location from the transmitter increases. The resistance measured by each electrode will be influenced to some degree by the resistivity of the mud, mudcake, invaded zones and uninvaded zones. The position of the electrode in the array will determine which, if any, of these predominate in influencing the resistivity determined at that electrode.

We claim:

1. Apparatus for use in determining the resistivity of an underground formation surrounding a borehole which comprises an elongate body that is moveable through the borehole; first and second transmitters spaced apart on the body, each serving, in use, to establish a current in the body and in the underground formation; a plurality of electrodes spaced apart on the body between the transmitters; means, located at each electrode, for measuring radial current flow along a path from the body to the underground formation via a respective electrode; and means for obtaining an axial current flowing along the body at a position corresponding to each electrode and means for measuring the axial current between the transmitters.

2. Apparatus as claimed in claim 1, wherein the body comprises a central mandrel and the electrodes comprise ring electrodes surrounding the mandrel and connected thereto.

3. Apparatus as claimed in claim 2, wherein the central mandrel is conductive and each electrode has its own electrical connection to the mandrel.

4. Apparatus as claimed in claim 2, wherein each ring electrode is be extended in the axial direction and separated from it neighbors by an insulating gap.

5. Apparatus as claimed in claim 2, wherein the ring electrodes are divided circumferentially into segments defining a series of azimuthal electrodes with means for measuring the radial current through each azimuthal electrode.

6. Apparatus as claimed in claim 1, wherein the electrodes comprise a series of closely spaced electrodes near one of the transmitters and at least one other electrode situated between the series and the other transmitter.

7. Apparatus as claimed in claim 1, comprising at least one further transmitter spaced from the body and electrically connected thereto.

8. Apparatus as claimed in claim 7, wherein a plurality of further transmitters is provided, at least one of which also includes an associated electrode with radial and axial current sensors.

9. Apparatus as claimed in claim 1, further including means for analyzing the axial and radial currents to determine the resistivity of the underground formation.

10. Apparatus as claimed in claim 1, wherein an outer surface portion of the tool body adjacent the transmitters is extended radially outwardly to form a bulge.

11. A method of determining the resistivity of an underground formation surrounding a borehole comprising positioning a tool in the borehole which comprises a body having first and second transmitters spaced apart thereon and a plurality of electrodes spaced apart on the body between the transmitters, the method comprising generating a current in the body and the underground formation with the first transmitter and measuring, at each electrode, a first radial current $R_1$ along a path from the body to the formation via that electrode and obtaining a first axial current $M_{01}$ along the body at each electrode; generating a current in the body and the underground formation with the second transmitter and measuring, at each electrode, a second radial current $R_2$ along a path from the body to the formation via that electrode and obtaining a second axial current $M_{02}$ along the body at each electrode; measuring the axial current $M_{12}$ along the body from the first transmitter at the location of the second transmitter and deriving the resistivity of the formation from the first and second radial currents $R_1$, $R_2$, the first and second axial currents $M_{01}$, $M_{02}$ and the total axial current $M_{12}$.

12. A method as claimed in claim 11, comprising calculating a focused radial current $R_c$ for each electrode according to the relationship $R_c = 1/M_{21}(M_{02}R_1 + M_{01}R_2)$ and determining the resistivity of the formation from the focused radial current $R_c$.

13. A method as claimed in claim 11, comprising maintaining the electrodes at the same potential as the body such that current from an electrode flows deeper into the formation the further that electrode is from either of the transmitters.

14. A method as claimed in claim 13, comprising determining the radial extent of formation invasion from the responses of electrodes at differing spacings from the transmitters.

15. A method as claimed in claim 13, comprising determining the resistivity of different zones of formation invasion from the responses of electrodes at differing spacings from the transmitters.

16. A method as claimed in claim 11, comprising determining the resistivity of a drilling fluid in the borehole from the radial current measured adjacent the transmitters.

17. A method as claimed in claim 11, comprising generating signals representative of the currents and using the signals to derive the formation resistivity.

18. Apparatus for determining the resistivity of an underground formation surrounding a borehole comprising an elongate electrically conductive body that is moveable through the borehole; first transmitter means for establishing a first current in the body from a first transmitter position on the body, the first current traveling in a path that includes the body and the formation; at least one ring electrode encircling the body and having a surface that is electrically isolated from the surface of the body; means for measuring at said at least one ring electrode a first electrical signal resulting from the first current; second transmitter means for establishing a second current in the body from a second transmitter position on the body, the second current traveling in a path that includes the body and the formation; means for measuring at said at least one ring electrode a second electrical signal resulting from the second current; current monitor means for measuring the axial current passing a monitor position on the body to obtain a monitor current value; and means for deriving an indication of formation resistivity as a function of the first and second signals and the monitor current value.

* * * * *